Patented May 29, 1945

2,377,116

UNITED STATES PATENT OFFICE 2,377,116

HYDROGENATION OVER SULPHUR-SENSITIVE CATALYSTS

Alexis Voorhies, Jr., Baton Rouge, La., and Eldon E. Stahly, Pittsburgh, Pa., assignors to Standard Catalytic Company No Drawing. Application June 27, 1941,
Serial No. 400,100

1 Claim. (Cl. 196—53)

This invention relates to the hydrogenation of distillable carbonaceous materials in the presence of catalysts which are sensitive to sulphur poisoning and is more particularly concerned with an improved method of operation by means of which sulphiding and deactivation of the catalysts may be substantially avoided.

Although the invention is applicable to all types of catalysts which are sensitive to sulphur, it is of particular value in connection with catalysts which consist of metallic nickel, cobalt or iron deposited upon highly active cracking catalysts such as aluminum silicate, synthetic impregnated or plural gels of silica and alumina, silica and magnesia, or silica and alumina and magnesia, or acid-treated clays of the bentonitic and montmorillonitic types. The quantity of metal in these catalysts is between 1 and 20% by weight and is preferably between 2 and 10% by weight. The active carrier may or may not first be treated with fluorine, hydrofluoric acid, fluosilicic acid or other fluorine compounds.

These catalysts may be prepared by impregnating the active carrier with a solution of a soluble salt of the metal, preferably the nitrate; extruding or otherwise shaping the impregnated, plastic mass so obtained; drying the shaped mass in a steam oven at about 300 to 400° F.; heating the dried mass in a furnace to a temperature between 500 and 800° F., for a period of 10 to 12 hours or more; and then reducing the metal oxide to the metal by circulating hydrogen over the mass while the temperature is gradually raised to a temperature between 600 and 900° F.

Catalysts of the type described are useful in hydrogenation generally but are especially effective in the destructive hydrogenation of hydrocarbon oils of the type of heavy naphthas, kerosenes and gas oils to produce motor fuels of high octane number. The improvement in octane number when using these catalysts is appreciably greater than when using other types of sulphur-insensitive catalysts.

The operating conditions under which these catalysts may be used for destructive hydrogenation of hydrocarbon oils are as follows: the temperature may vary between 550 and 1050° F.; the pressure may be between slightly above atmospheric pressure and as high as 10,000 pounds per square inch or more, although the preferred range will in most cases be between 1000 and 3000 pounds per square inch; the feed rate may be between about 0.1 and 4.0 volumes of liquid oil per volume of catalyst per hour; and the quantity of hydrogen which accompanies the oil through the reaction zone may be between 500 and 15,000 cubic feet per barrel of oil, part of which is fresh hydrogen and part recycled hydrogen-containing gas.

It has previously been found that while these catalysts are sensitive to sulphur, they may nevertheless be used for prolonged periods in the destructive hydrogenation of hydrocarbon oils without becoming substantially sulphided or losing activity provided the sulphur content of the feed stock is kept below certain maximum amounts.

We have now found that there is a definite and determinable relationship between the sulphur content of the feed stock and the quantity of hydrogen which must accompany the oil during the reaction in order to avoid substantial sulphiding and deactivation of the sulphur-sensitive catalyst. By making use of this relationship, it is therefore possible to avoid harmful sulphiding of the catalyst in the treatment of a hydrocarbon oil of substantial sulphur content in the presence of these catalysts by maintaining the required quantity of hydrogen circulating with the oil during the reaction.

The nature of this relationship and the manner in which it may be adapted to the operation of the hydrogenation process conducted in the presence of sulphur-sensitive catalysts will be fully understood from the following description:

If H represents the cubic feet of hydrogen per barrel of oil to be treated; S represents the weight percent of sulphur in said oil and T represents the temperature in degrees Fahrenheit at which the oil is to be treated, then $$H = K\frac{S}{T}$$

wherein K is a determinable constant for each particular catalyst. For the catalysts with which this invention is concerned K has a value in the range between $0.8 \times 10^8$ and $4 \times 10^8$ for the usual hydrogenation temperatures between 550 and 1000° F. In the case of nickel, this value lies in the approximate range between $0.8 \times 10^8$ and $1.8 \times 10^8$. The value of K varies only slightly with temperature; for example, with a catalyst comprising about 7% metallic nickel supported on acid treated clay, it decreases from a value of $1.25 \times 10^8$ at 600° F. to a value of $0.9 \times 10^8$ at 1000° F.

To illustrate how the relationship is applied, the value of K for a particular catalyst can be determined experimentally for a given temperature by carrying out a destructive hydrogenation with a feed stock of known sulphur content and noting what quantity of hydrogen just prevents the catalyst from becoming harmfully sulphided. Then having determined the value of K for this catalyst, if another feed stock of different sulphur content is to be treated, the quantity of hydrogen that must accompany the oil during the treatment at a particular temperature can be determined from the above formula. It will be understood, of course, that the formula will indicate the minimum quantity of hydrogen that must be used to prevent sulphiding of the catalyst and that larger quantities can of course be used, if desired. Thus if a nickel catalyst is to be used at a temperature of 725° F. for the treatment of an oil containing 0.05% by weight of sulphur, the value of K would be $1.2 \times 10^8$ and the minimum quantity of hydrogen that must be used in order to avoid harmful sulphiding of the catalyst would be determined as follows:

$$H = K\frac{S}{T} = 1.2 \times 10^8 \times \frac{0.05}{725} = 8300 \text{ cubic feet per barrel}$$

Conversely, if it is desired to maintain a given quantity of recirculated hydrogen, the above formula makes it possible to determine the maximum sulphur content which is permissible in the feed stock in order to avoid substantial sulphiding and deactivation of the catalyst. The following table shows the maximum sulphur content which is permissible in the feed stock when using different catalysts at different temperatures and maintaining a constant volume of hydrogen of 8000 cubic feet per barrel of oil. It will be noted that the values of K for cobalt and iron are higher than that for nickel:

| Catalyst | Temp., °F. | Per cent sulphur in feed | K×10⁻⁸ |
|---|---|---|---|
| Nickel | 600 | 0.048 | 1.00 |
| Do | 725 | 0.06 | 0.97 |
| Do | 1,000 | 0.11 | 0.73 |
| Cobalt | 725 | 0.019 | 3.00 |
| Iron | 725 | 0.026 | 2.25 |

In accordance with the present invention, the hydrogenation operation is conducted in the presence of the sulphur-sensitive catalyst in such a manner that the quantity of hydrogen circulated is at least as large as that determined from the above formula. By operating in this manner, the reaction can be continued for indefinite periods without harmfully sulphiding or deactivating the sulphur-sensitive catalyst. One particular advantage of the invention is that the minimum amount of hydrogen which is required to prevent harmful sulphiding may be readily determined. Much larger amounts of hydrogen could be used but by operating with the minimum quantity required substantial savings may be effected in compressor costs and the capacity of the unit may be appreciably increased.

This invention is not limited by any theories of mechanism of the reactions nor by any details which have been given merely for purposes of illustration but is limited only in and by the following claim in which it is intended to claim all novelty inherent in the invention.

We claim:

In the destructive hydrogenation of hydrocarbon oils of the type of naphthas, kerosenes and gas oils in the presence of sulphur-sensitive catalysts comprising a minor amount of metal of the VIII group of the periodic system and a major amount of a normally solid siliceous material which promotes cracking, the method of preventing the sulphiding and deactivation of the catalyst which comprises maintaining the quantity of hydrogen circulated with the hydrocarbon oil at least equal to the value calculated from the formula $$H = K\frac{S}{T}$$

in which H is the quantity of hydrogen in cubic feet per barrel of oil, K is a constant having a value between the limits of $0.73 \times 10^8$ to $3.00 \times 10^8$, S is the weight per cent of sulphur in the initial hydrocarbon oil, and T is the temperature in degrees Fahrenheit at which the destructive hydrogenation is carried out.

ALEXIS VOORHIES, Jr.
ELDON E. STAHLY.